United States Patent

Tuli et al.

(10) Patent No.: US 9,288,750 B2
(45) Date of Patent: Mar. 15, 2016

(54) INBOUND ROAMING CONTROLS IN A SHARED NETWORK

(71) Applicant: Cellco Partnership, Basking Ridge, NJ (US)

(72) Inventors: Amol Tuli, Dublin, CA (US); Miguel A. Carames, Martinez, CA (US)

(73) Assignee: Cellco Partnership, Basking Ridge, NJ (US)

( * ) Notice: Subject to any disclaimer, the term of this patent is extended or adjusted under 35 U.S.C. 154(b) by 127 days.

(21) Appl. No.: 14/100,084

(22) Filed: Dec. 9, 2013

(65) Prior Publication Data

US 2015/0163659 A1    Jun. 11, 2015

(51) Int. Cl.
| | |
|---|---|
| *H04W 4/00* | (2009.01) |
| *H04W 48/18* | (2009.01) |
| *H04W 48/02* | (2009.01) |
| *H04W 48/16* | (2009.01) |
| *H04W 8/18* | (2009.01) |

(52) U.S. Cl.
CPC ............... *H04W 48/18* (2013.01); *H04W 8/18* (2013.01); *H04W 48/02* (2013.01); *H04W 48/16* (2013.01)

(58) Field of Classification Search
None
See application file for complete search history.

(56) References Cited

U.S. PATENT DOCUMENTS

| | | | | |
|---|---|---|---|---|
| 8,369,852 | B2* | 2/2013 | Buckley | H04W 48/18 370/328 |
| 8,391,857 | B2* | 3/2013 | Catalano et al. | 455/432.1 |
| 8,565,689 | B1* | 10/2013 | Rubin | H04L 67/26 370/232 |
| 8,855,634 | B2* | 10/2014 | Klatt | H04W 36/36 455/435.1 |
| 2007/0218898 | A1* | 9/2007 | Agarwal et al. | 455/433 |
| 2007/0287419 | A1* | 12/2007 | Wang | 455/411 |
| 2010/0190497 | A1* | 7/2010 | Pudney et al. | 455/435.1 |
| 2010/0267384 | A1* | 10/2010 | Dwyer et al. | 455/435.2 |
| 2011/0177810 | A1* | 7/2011 | Kim | 455/432.1 |
| 2012/0044869 | A1* | 2/2012 | Tiwari | 370/328 |
| 2012/0243467 | A1* | 9/2012 | Vallurupalli et al. | 370/328 |
| 2013/0035095 | A1* | 2/2013 | Wang et al. | 455/433 |
| 2013/0189978 | A1* | 7/2013 | Lee et al. | 455/434 |
| 2014/0342731 | A1* | 11/2014 | Carames et al. | 455/432.1 |
| 2014/0357285 | A1* | 12/2014 | Smith | H04W 48/17 455/450 |
| 2015/0065125 | A1* | 3/2015 | Patel et al. | 455/433 |

* cited by examiner

*Primary Examiner* — Michael J Moore, Jr.

(57) ABSTRACT

A method includes receiving, at a network device in a shared network that includes a plurality of PLMNs, a request from an inbound roaming user device to connect to a home network of the inbound roaming user device. The method also includes identifying, by the network device, a PLMN selected by the inbound roaming user device, and accessing a listing of allowed PLMNs and disallowed PLMNs for roaming in the shared network. The method includes determining whether the selected PLMN is an allowed PLMN and blocking the connection to the home network in response to a determination that the selected PLMN is not an allowed PLMN.

20 Claims, 8 Drawing Sheets

INBOUND ROAMING CONTROLS IN A
SHARED NETWORK

BACKGROUND

The third generation partnership project (3GPP) is a joint venture of international standards bodies for the promotion of high-speed cellular services that are commonly referred to as 3G. 3GPP provides specifications for global system for mobile communications (GSM) carriers, and 3GPP2 relates to code division multiple access (CDMA) carriers. 3GPP maintains general packet radio service (GPRS), which is a packet oriented mobile data service that allows second generation (2G), 3G, and wireless CDMA (WCDMA) networks to transmit Internet protocol (IP) packets to external networks. 3GPP defines two network sharing architectures, namely multiple operator core network (MOCN) and gateway core network (GWCN) architectures. MOCN allows sharing of only the radio access network (RAN), whereas GWCN allows RAN sharing as well as sharing of gateway nodes, such as the mobile switching center (MSC) and serving GPRS support node (SGSN).

Currently, 3GPP compliant devices can select any public land mobile network (PLMN) that is broadcasted over the air, even if that PLMN is not explicitly configured by a home operator on the universal integrated circuit card (UICC) preferred PLMN lists. Typically, roaming agreements are configured on the network in terms of allowed PLMNs associated with authorized roaming partners. A mobility management entity (MME) typically performs a gatekeeping function via a roaming database that helps the MME cross check which roaming subscribing devices to let through using the service provider PLMN that is broadcast over the air interface.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein may be implemented in a shared network maintained by a first entity (e.g., a service provider) that includes multiple broadcasted public land mobile networks (PLMNs), such as a first PLMN associated with the first entity and a second PLMN associated with a second entity (e.g., a lessee of the service provider). The network may include enhanced node base stations (eNodeBs) that broadcast both PLMNs. The systems and methods may provide protection for inbound roaming user devices associated with a bilateral partner (i.e., a different service provider that is the home network of the inbound roaming user device) of the first entity that are allowed to connect to the bilateral partner's network via the first PLMN. In instances in which the inbound roaming user equipment selects the second PLMN, the systems and methods may prevent the establishment of a session towards the bilateral partner's network.

Figure 1:
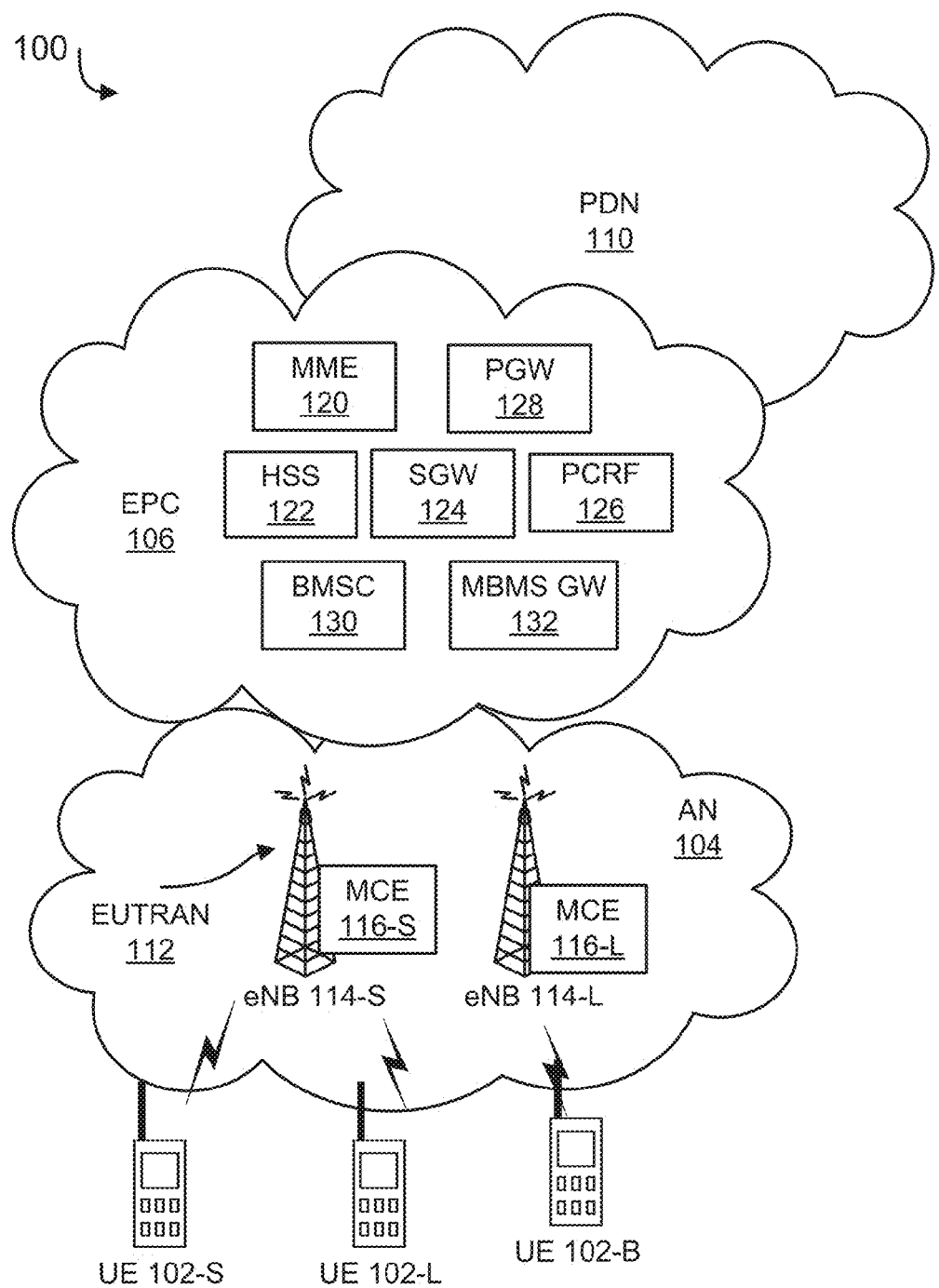
FIG. 1 is an exemplary long term evolution (LTE) network in which systems and/or methods described herein may be implemented.

FIG. 1 is a diagram of an exemplary LTE network 100. As illustrated, LTE network 100 includes a number of user equipment (UE) (i.e., user devices, shown as UE 102-S (associated with a service provider), UE 102-L (associated with a lessee entity) and UE 102-B (associated with a bilateral partner entity (e.g., another service provider) of the service provider) (collectively referred to as UEs 102 or individually as UE 102), an access network (AN) 104, an evolved packet core (EPC) network 106, and a packet data network (PDN) 110, such as the Internet or a proprietary packet data network. Network 100 may be a shared network maintained by a first entity (e.g., the service provider) that includes multiple broadcasted public land mobile networks (PLMNs), such as a first PLMN associated with the first entity and a second PLMN associated with a second entity (e.g., a lessee of the service provider). For example, the service provider and the lessee may have entered into a network sharing agreement in which lessees deploy associated equipment that broadcast PLMNs associated with the service provider and the lessee.

Access Network 104 may include an evolved universal terrestrial radio access network (E-UTRAN) 112 and a number of eNodeBs (eNBs) 114-S (associated with the service provider) and 114-L (associated with the lessee) or enhanced node base stations (collectively referred to as eNBs 114 or individually as eNB 114). Each eNB 114 may include a corresponding multicast coordination entity (MCE) 116 (respectively MCE 116-S and 116-L, collectively referred to as MCEs 116 or individually as MCE 116). EPC 106 may include a mobility management entity (MME) 120, a home subscriber server (HSS)/authentication, authorization, and accounting (AAA) server 122, a serving gateway (SGW) 124, policy and charging rules function (PCRF) device 126, a PDN gateway (PGW) 128, a broadcast multicast service center (BMSC) 130, and a multimedia broadcast multicast service gateway (MBMS GW) 132. Devices/networks of network 100 may interconnect via wired and/or wireless connections.

Three UEs 102, AN 104, EPC 106, PDN 110, E-UTRAN 112, two eNBs 114, two MCEs 116, MME 120, HSS 122, SGW 124, PCRF 126, PGW 128, BMSC 130, and MBMS GW 132 have been illustrated in FIG. 1 for simplicity. In practice, there may be more or fewer devices or components. For example, a typical network 100 includes millions of subscriber UEs 102, thousands of eNBs 114, hundreds of SGWs 124 and several PGWs 128 and MBMS GWs 130 effectively forming a hierarchical access network in which traffic passes from PDN 110 to UE 102 via, for example, a particular MBMS GW 132, PGW 128, SGW 124, and eNB 114.

UE 102 may include a radiotelephone, a personal communications system (PCS) terminal (e.g., that may combine a cellular radiotelephone with data processing and data communications capabilities), a wireless telephone, a cellular telephone, a smart phone, a personal digital assistant (PDA) (e.g., that can include a radiotelephone, a pager, Internet/intranet access, etc.), a laptop computer, a personal computer, a tablet computer, or other types of computation or communication devices. In an exemplary implementation, UEs 102 may include any device that is capable of communicating over access network 104, EPC network 106, and/or PDN 110. UE 102 operates according to one or more versions of the LTE communication standard.

Different UEs 102 may be associated with or be subscribers of different entities including the service provider (UE 102-S), the lessee entity (UE 102-L) and bilateral partners (e.g., other service providers) (UE 102-B). The bilateral partner may have an agreement with the service provider whereby the inbound roaming user equipment (UE 102-B, the bilateral partner service provider's customer) is allowed to connect to the bilateral partner's network to establish sessions via the service provider's network (and service provider's PLMN). The leasing agreement between the service provider and the lessee entity may allow network sharing between the service provider and the lessee entity (e.g., a rural operator) for LTE coverage, and the LTE coverage may, in turn, be used by the UE 102-B when roaming within the shared network.

Access network 104 includes a communications network that connects subscribers (e.g., UE 102) to the service provider. In one example, access network 104 may include a WiFi network or other access networks (e.g., in addition to E-UTRAN 112). EPC 106 may include a core network architecture of the Third generation partnership project (3GPP) LTE wireless communication standard. PDN 110 includes a network that provides data services (e.g., via packets or any other Internet protocol (IP) datagrams). For example, PDN 110 may include the Internet, an intranet, an asynchronous transfer mode (ATM) network, etc.

E-UTRAN 112 includes a radio access network capable of supporting high data rates, packet optimization, large capacity and coverage, etc. E-UTRAN 112 includes a plurality of eNBs 14.

eNBs 114 includes network devices that operate according to one or more versions of the LTE communication standard. For example, eNBs 114 may be configured to respond to UE requests, forward information regarding UEs 102 to MME 120 and/or SGW 124, set up tunneling sessions with other devices (e.g., SGW 124 and PGW 128), etc. eNBs 114 are base stations in network 100 and may include control plane connections to other network elements. eNBs 114 may include MCEs 116.

MCEs 116 may allocate radio resources used by all eNBs 114 in the multicast/broadcast single frequency network (MBSFN) area for multi-cell MBMS transmissions using MBSFN operations. The MBSFN area is a specific area in which multiple cells transmit the same content using a single frequency network. Each eNB 114 may have an associated MCE 116, which may be integrated into the eNB 114. In addition to allocation of the time/frequency radio resources, MCEs 116 may also determine or implement further details of the radio configuration, such as a modulation and coding scheme (MCS). The MCE may also be involved in MBMS session control signaling.

MME 120 is responsible for idle mode tracking and paging procedures (e.g., including retransmissions) for UE 102. For example, MME 120 maintains information regarding a current state (e.g., powered on, location, etc.) of UE 102. MME 120 is also involved in the bearer activation/deactivation process (e.g., for UE 102) and operates to choose a particular SGW 124 for UE 102 at an initial attach time and at a time of intra-LTE handover. In addition, MME 120 authenticates UE 102 (e.g., via interaction with HSS 122). Non-access stratum (NAS) signaling terminates at MME 120 and MME 120 generates and allocates temporary identities to UEs (e.g., UE 102).

Furthermore, MME 120 may check authorization of UE 102 to connect to the network via a valid PLMN (e.g., a PLMN recognized by EPC 106, such as the service provider's PLMN or the lessee PLMN). The lessee PLMN may be recognized as a valid PLMN based on a sharing agreement between the service provider and the lessee entity. MME 120 may enforce roaming restrictions for UE 102 that connects via a valid PLMN. MME 120 may be a termination point in EPC network 106 for ciphering/integrity protection for NAS signaling and may handle security key management. MME 120 may provide a control plane function for mobility between LTE and second generation mobile telecommunications or third mobile generation telecommunications (2G/3G) 3GPP access networks with an S3 interface (i.e., an interface that provides the connection between a serving general packet radio service (GPRS) support node (SGSN) (e.g., in a 3G network) and MME 120 in LTE network 100) terminating at MME 120. MME 120 may also terminate an S6a interface (which enables transmission of subscription and authentication data) towards HSS 122 for roaming UEs 102.

HSS/AAA 122 is configured to include a master user database that supports devices on PDN 110 that handle calls, such as proxy devices, session border controllers, etc. HSS/AAA 122 may contain subscription-related information (e.g., subscriber profiles), may perform authentication and authorization of a user based on requests received from MME 120, and may provide information about a subscriber's location and IP information.

SGW 124 routes and forwards user data packets, acts as a radio mobility anchor for a user plane during inter-eNB handovers, and also acts as an radio anchor for mobility between LTE and other 3GPP technologies (referred to as "inter-3GPP mobility"). As shown, SGW 124 is connected to eNBs 114 to provide a radio layer mobility control plane. In addition, SGW 124 manages and stores contexts associated with UE 102 (e.g., parameters of an IP bearer service, network internal routing information, etc.).

PCRF 126 provides policy control decision and flow based charging control functionalities. PCRF 126 may provide network control regarding service data flow detection, gating, quality of service (QoS) and flow based charging, etc. PCRF 126 may determine how a certain service data flow is to be treated, and may ensure that user plane traffic mapping and treatment is in accordance with a user's subscription profile.

PGW 128 includes one or more data transfer devices (or network devices), such as a gateway, a router, a switch, a firewall, a network interface controller (NIC), a hub, a bridge, a proxy server, an optical add/drop multiplexer OADM, or some other type of device that processes and/or transfers data. PGW 128 provides connectivity of UE 102 to external packet data networks (e.g., to PDN 110) by being a traffic exit/entry point for UE 102. As described briefly above, UE 102 may connect to PGW 128 via one or more tunnels established between eNB 114 and PGW 128, such as one or more GPRS Tunneling Protocol (GTP) tunnels. UE 102 may simultaneously connect to more than one PGW for accessing multiple PDNs. PGW 128 may perform policy enforcement, packet filtering for each user, charging support, lawful intercept, and packet screening. PGW 128 may also act as an anchor for mobility between 3GPP and non-3GPP technologies.

BMSC 130 may be a functional entity that manages provision of multicast services or broadcast services to UE 102 and an end-user, such as currently implemented in 2G and 3G MBMS architectures. BMSC 130 may provide an entry point for content providers or other broadcast/multicast source, which is external to the network. BMSC 130 may perform authorization, scheduling, and security procedures in support of the multicast services or broadcast services. For example, BMSC 130 may provide authorization for terminals requesting to activate an MBMS service. BMSC 130 may schedule broadcast/multicast sessions. BMSC 130 may also implement integrity and confidentiality protection of MBMS data and may issue MBMS session announcements.

BMSC 130 may support MBMS bearer signaling that sets up and releases context at the establishment and termination of MBMS sessions. BMSC 130 may also support user related signaling, e.g., for multicast session authorization, or user session joining or detaching from multicast sessions.

MBMS GW 132 may send/broadcast MBMS packets to each eNB 114 transmitting the (broadcast or multicast) service. MBMS GW 132 may be a logical entity that is present between BMSC 130 and eNBs 114 in network 100. MBMS GW 132 may be part of another network element, such as a router, etc. MBMS GW 132 may use IP multicast to forward MBMS user data to eNB 114. MBMS GW 132 may perform MBMS session control signaling (e.g., session start/stop) towards the E-UTRAN 112 via MME 120.

As described herein, systems and methods may implement inbound roaming controls in a shared network maintained by a first entity that includes multiple broadcasted PLMNs. The broadcasted PLMNs may include a first PLMN associated with the first entity and a second PLMN associated with a second entity. The network may include eNodeB's that broadcast both PLMNs. The systems and methods may provide protection for inbound roaming user equipment (i.e., user devices) associated with a bilateral partner service provider of the first entity that are allowed to connect to bilateral partner's network (i.e., the home network of the inbound roaming user device) via the first PLMN.

In instances in which the inbound roaming user equipment selects the second PLMN, the systems and methods may prevent the establishment of a session towards the home network. If the session is allowed, the service provider may not be a party to settlement of billing for the service (as the lessee's PLMN will be reported) or the bilateral partner service provider may not recognize the lessee PLMN and may therefore not provide payment for the services accessed by the inbound roaming user equipment. The systems and methods may prevent revenue loss and fraud in instances in which the lessee (and lessee PLMN) is not known to the bilateral service provider or there is no existing agreement regarding roaming via the lessee's PLMN with the service provider (e.g., the lessee may receive payment due to the service provider). The systems and methods may prevent the lessee from receiving payments for roaming services on the LTE network via the lessee PLMN which are not authorized by the service provider.

Figure 2:
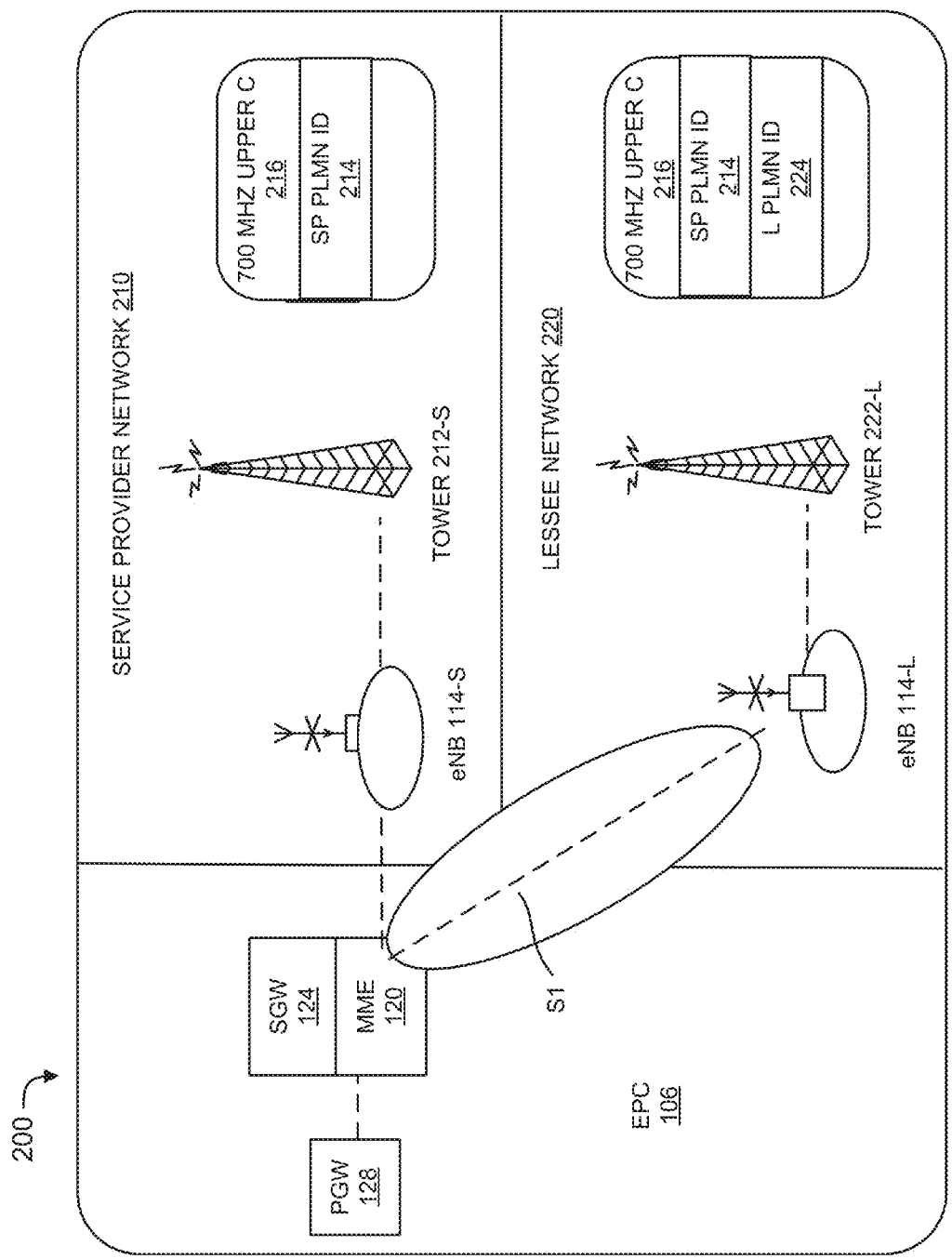
FIG. 2 is an exemplary shared network including a service provider PLMN and a lessee PLMN in which systems and/or methods described herein may be implemented.

FIG. 2 is a diagram of an exemplary shared network 200 including multiple PLMNs. As shown in FIG. 2, shared network 200 may include EPC 106, a service provider network 210 that broadcasts a service provider (SP) PLMN (PLMN ID 214) associated with the service provider and a lessee network 220 that also broadcasts the service provider PLMN in addition to a lessee (L) PLMN (PLMN ID 224) associated with the lessee.

As shown in FIG. 2, the service provider may maintain a service provider network 210 that includes eNodeB 114-S and cellular tower 212-S and broadcasts the service provider PLMN. The service provider network 210 may connect back into EPC 106 via an S1 interface. The S1 interface is an interface between eNodeBs 114 and MME 120 and SGW 124 based on GPRS tunneling protocol (GTP) user data tunneling (i.e., GTP-U). The service provider PLMN may broadcast a PLMN identifier (ID) 214 and cover or include a particular portion of the radio frequency spectrum (e.g., shown in FIG. 2 as 700 Megahertz (700 MHz), Upper C). The service provider and the lessee may have entered in a network sharing agreement whereby the lessee leases spectrum from the service provider in order to deploy their own eNodeBs 114-L (and associated towers 212-L), which then connect back into EPC 106 (associated with or maintained by the service provider) via S1 interface. The shared network may include a leased network in which the radio access network (RAN) and EPC 106 are shared by the service provider (main network operator) and the lessee entity. In addition, lessee subscriber may have the same international mobile subscriber identities (IMSIs) as the service provider (i.e., the home operator for the network), hence in some instances EPC 106 may be unable to identify lessee subscribers (i.e., subscribers of the lessee entity) differently from subscribers of the service provider. The lessee provider may lease the RAN and EPC 106 from the service provider and supple lessee subscribers from a same set of IMSIs as provided to subscribers of the service provider.

Lessee eNodeBs 114-L may broadcast multiple PLMNs over the air interface based on the leasing agreement. The multiple PLMNs may include the service provider PLMN for subscribers of the service provider and a lessee PLMN (L PLMN ID 224) for subscribers of the lessee entity. In instances in which there are multiple lessees, each lessee may be provided their own PLMN that identifies the RAN of that particular lessee. EPC 106 may be configured to support PLMNs for multiple different lessee PLMNs 220, in addition to service provider PLMN 210. Lessees may be contractually prohibited (i.e., not permitted) to negotiate their own bilateral LTE roaming agreements, but may be allowed to provide LTE services based on established agreements between the service provider and bilateral partner service providers. As part of lessee network sharing, lessee PLMNs are broadcast over the air for the lessee's own subscribers but are not offered as roaming PLMNs for inbound roamers on the service provider's LTE core network.

In the event of a domestic or international inbound roamer roaming under lessee footprint (i.e., within the broadcast area of PLMNs provided by lessee eNodeBs 114 and towers 212-L), UE 102-B is expected to select the service provider PLMN (SP PLMN ID 214) in accordance with the roaming agreement between the service provider and the bilateral partner service providers. The lessee eNodeB 114-L may broadcast a lessee PLMN (i.e., the lessee network's own identity) in addition to the service provider PLMN. UE 102-B may scan the airway and selects the preferred PLMN (i.e., the service provider PLMN). The selected PLMN, in this instance the service provider PLMN, is known as the serving PLMN. However, in instances in which inbound roamer device selects the lessee PLMN (L PLMN ID 224), either manually or otherwise, EPC 106 may allow the session (i.e., honor the request or implement processes to set up the session) since the lessee PLMN is known to EPC 106 due to the network sharing agreement described above.

In honoring the request from the roaming device, EPC 106, specifically MME 120 and SGW 124, may authenticate and establish the LTE session towards bilateral partner service provider's home network (i.e., contact the home network in order to complete the session). The PLMN reported to the bilateral partner service provider's home network in this scenario is the serving PLMN, i.e. the lessee's PLMN (L PLMN ID 224). The lessee and bilateral partner may not have any direct bilateral agreements based on requirements of the leasing agreement between the service provider and the lessee. In many instances, it is the responsibility of the visited network (i.e., the service provider network) to allow or block roamers into its network. However, in this instance, the visited network may have allowed the session to be established. If the home network does not have any roaming controls, which may occur in some instances, and allows the session to be established, the inbound roaming device may receive service while roaming on lessee's footprint (i.e., the lessee PLMN).

In instances in which the inbound roaming device establishes a session via the lessee PLMN, the visited network (i.e., the service provider) may create charging records using the lessee PLMN (L PLMN ID 224), instead of the service provider PLMN (SP PLMN ID 214), as that the lessee PLMN is reported by the roaming device in signaling and is honored by EPC 106 due to the network sharing arrangement. However, the service provider may not be in a position to collect any revenue. The home network may ignore or be unable to process settlement requests because the home network may not be able to recognize the lessee PLMN reported in transferred account procedure (TAP) records. The TAP records may be discarded or otherwise handled as an exception (e.g., "error out"). In some instances, even if the home network settles the charges via a clearinghouse associated with the home network, the service provider may be excluded from that settlement process because the service provider PLMN is not reported in the TAP records.

Systems and methods described herein prevent settlement issues associated with the inbound roaming device selecting the lessee PLMN by blocking and preventing such sessions to being set up in the service provider's network that is shared with lessees.

Figure 3:
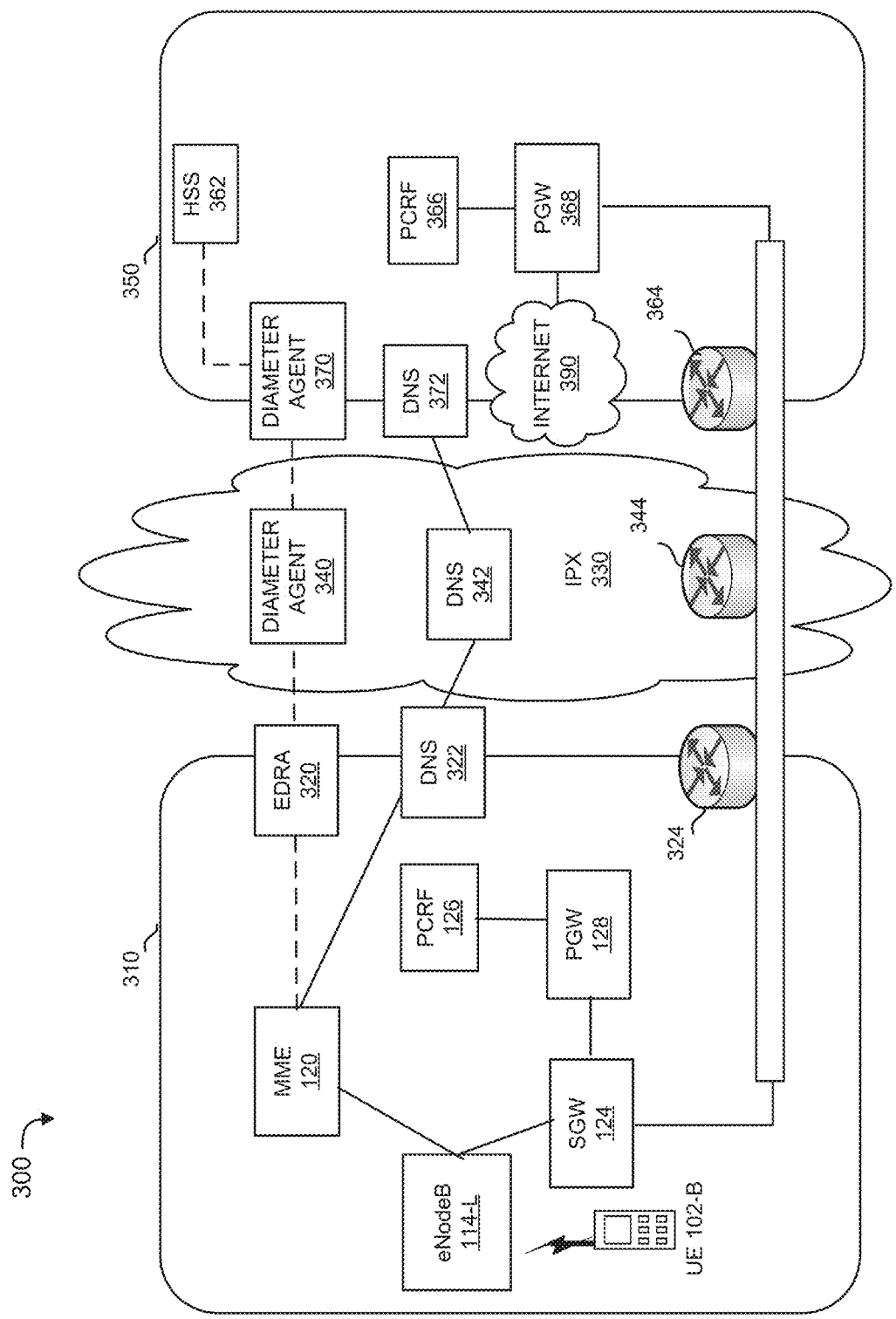
FIG. 3 illustrates an exemplary architecture for providing communications between a visited shared network and a home network for roaming controls of an inbound roaming user device.

FIG. 3 is a diagram of an exemplary architecture 300 for providing communications between a visited shared network and a home network for roaming controls of an inbound roaming user device (e.g., UE 102-B). As shown in FIG. 3, architecture 300 may include shared LTE network 310 (for example, a shared portion of an LTE network such as network 100 described in FIG. 1), internetwork packet exchange (IPX) 330, and bilateral partner home network 350. Shared network 310 may include eNodeB 114-L, MME 120, SGW 124, PCRF 126, PGW 128, an enhanced diameter routing agent (EDRA) 320, and a domain name server (DNS) 322. IPX 330 may include a diameter agent 340, and DNS 342. Bilateral partner home network 350 may include similar components as the shared network 310, including its own HSS 362, PCRF 366, PGW 368, diameter agent 370 and DNS 372, and may connect to the Internet 380 via PGW 368. Each of shared LTE network 310, IPX 330 and bilateral partner home network 350 may include routers (324, 344, and 364) that connect SGW 124 of the visited network to the PGW 368 of the home network.

Shared network 310 may be configured to share both eNodeB 114-L and the entire EPC 106 core, including MME 120, SGW 124, PGW 126, etc. The shared network 310 provides these shared functions and equipment to the lessee network in addition to RAN sharing and shared gateway nodes, such as MSC and SGSN, which are also allowed under the GWCN network sharing architecture. The subscribers of the lessee entity are provisioned with service provider IMSI blocks that are recognized by EPC 106 in a similar manner to subscribers of the service provider. EPC 106 core may have no visibility into any differences between the lessee subscriber and the service provider's subscriber because the IMSI series for both sets of subscribers may contain the service provider's MCC/MNC.

As shown in FIG. 3, the roaming device (e.g., UE 102-B) may be a 3GPP compliant device that can select any PLMN that is broadcasted over the air, even if that PLMN (such as, for example, the lessee PLMN) is not explicitly configured by the home operator on the UICC PLMN lists. Roaming agreements may be configured on the service provider network in terms of allowed PLMNs from roaming partners. MME 120 may be a gatekeeper via a roaming database that MME 120 uses to cross check which roaming subscribers to let through using valid PLMNs broadcasted over the air interface. However, based on the lessee and service provider relationship, MME 120 may be configured to allow valid selection of the lessee PLMN by UEs 102 because the lessee subscribers are part of the same EPC 106. The inbound roaming device (e.g., UE 102-B) may, in some instances, intentionally or otherwise select the lessee PLMN, instead of the service provider PLMN for service, leading to potential loss of revenue and potential fraud for the service provider.

EDRA 320 may be positioned between the visited network's (network 310) MME 120 and the home network's (network 350) HSS 362 on the S6a interface and may detect instances in which UE 102-B is trying to gain access to service via a lessee PLMN or service provider PLMN. In these situations, EDRA 320 may identify whether the particular PLMN that the UE 102-B selected is the lessee PLMN or the service provider PLMN. If EDRA 320 detects that UE 102-B is trying to access HSS 362 via the lessee PLMN, EDRA 320 may block that attempt from going further and provide a valid cause code back to the UE 102-B, via EPC 106, thus preventing the UE 102-B from selecting the same lessee PLMN again.

Figure 4:
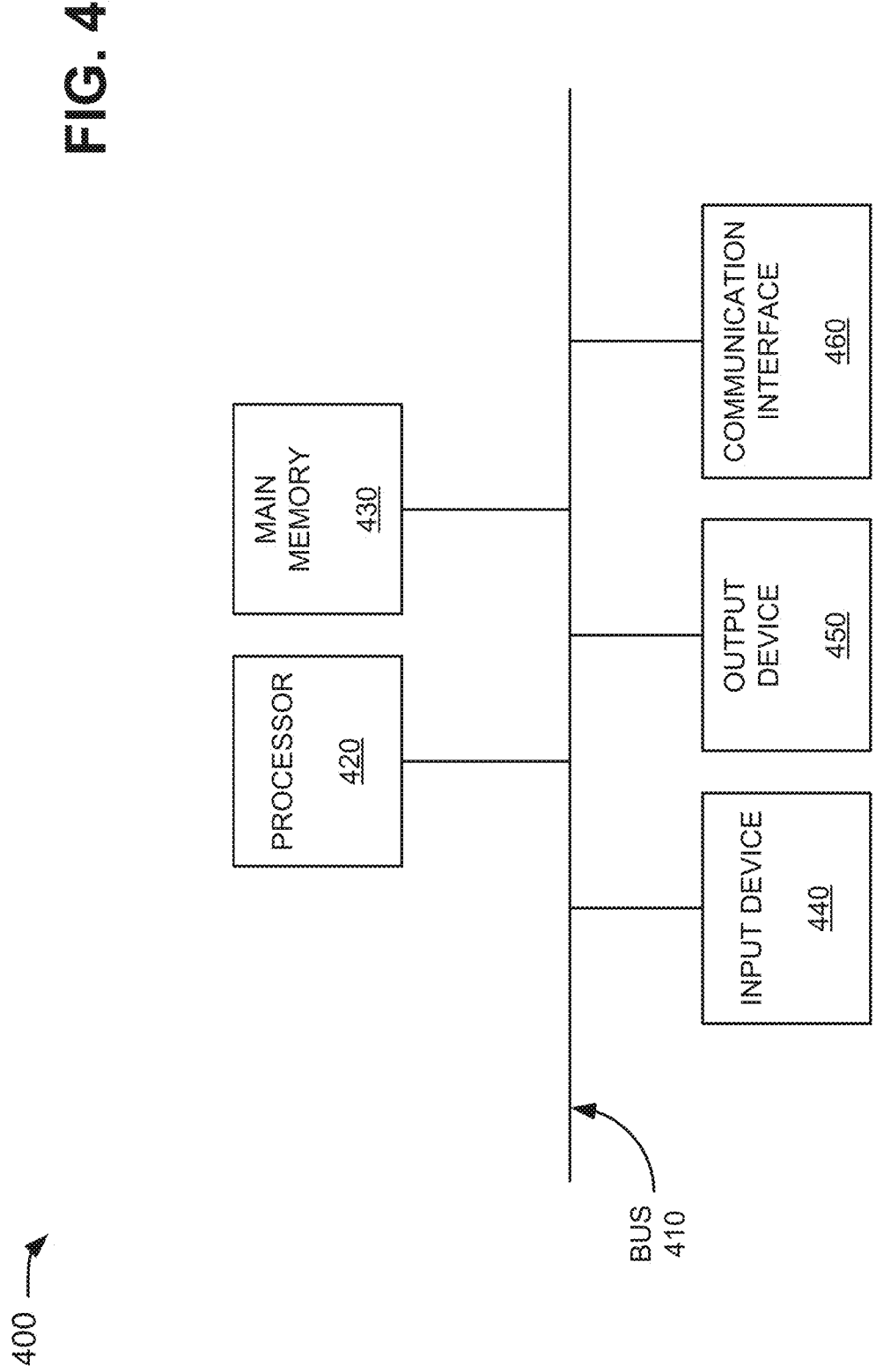
FIG. 4 is a block diagram of exemplary components of a device that may correspond to one of the devices of FIGS. 1-3.

FIG. 4 is a diagram of exemplary components of a device 400 that may correspond to UE 102, one or more devices in AN 104, EPC 106, PDN 110, E-UTRAN 112, eNodeB 114, MME 120, HSS 122, SGW 124, PCRF 126, PGW 128, BMSC 130, MBMS GW 132, tower 212-S, tower 222-L, EDRA 320, DNS 322, one or more devices in IPX 330, DNS 342, DNS 372, diameter agent 340, diameter agent 370, HSS 362, PCRF 366, and PGW 368, as described in FIGS. 1-3 above. As shown in FIG. 4, device 400 may include a bus 410, a processor 420, a memory 430, an input device 440, an output device 450, and a communication interface 460.

Bus 410 may permit communication among the components of device 400. Processor 420 may include one or more processors or microprocessors that interpret and execute instructions. In other implementations, processor 420 may be implemented as or include one or more application specific integrated circuits (ASICs), field programmable gate arrays (FPGAs), or the like.

Memory 430 may include a random access memory (RAM) or another type of dynamic storage device that stores information and instructions for execution by processor 420, a read only memory (ROM) or another type of static storage device that stores static information and instructions for the processor 420, and/or some other type of magnetic or optical recording medium and its corresponding drive for storing information and/or instructions.

Input device 440 may include a device that permits an operator to input information to device 400, such as a keyboard, a keypad, a mouse, a pen, a microphone, one or more biometric mechanisms, and the like. Output device 450 may include a device that outputs information to the operator, such as a display, a speaker, etc.

Communication interface 460 may include one or more transceivers that enables device 400 to communicate with other devices and/or systems. For example, communication interface 460 may include mechanisms for communicating with other devices, such as other devices of network 100.

As described herein, device 400 may perform certain operations in response to processor 420 executing software instructions contained in a computer-readable medium, such as memory 430. A computer-readable medium may include a non-transitory memory device. A memory device may include space within a single physical memory device or spread across multiple physical memory devices. The software instructions may be read into memory 430 from another computer-readable medium or from another device via communication interface 460. The software instructions contained in memory 430 may cause processor 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows exemplary components of device 400, in other implementations, device 400 may include fewer components, different components, differently arranged components, or additional components than depicted in FIG. 4. As an example, in some implementations, input device 440 and/or output device 450 may not be implemented by device 400. In these situations, device 400 may be a "headless" device that does not explicitly include an input or an output device. Alternatively, or additionally, one or more components of device 400 may perform one or more other tasks described as being performed by one or more other components of device 400.

Figure 5:
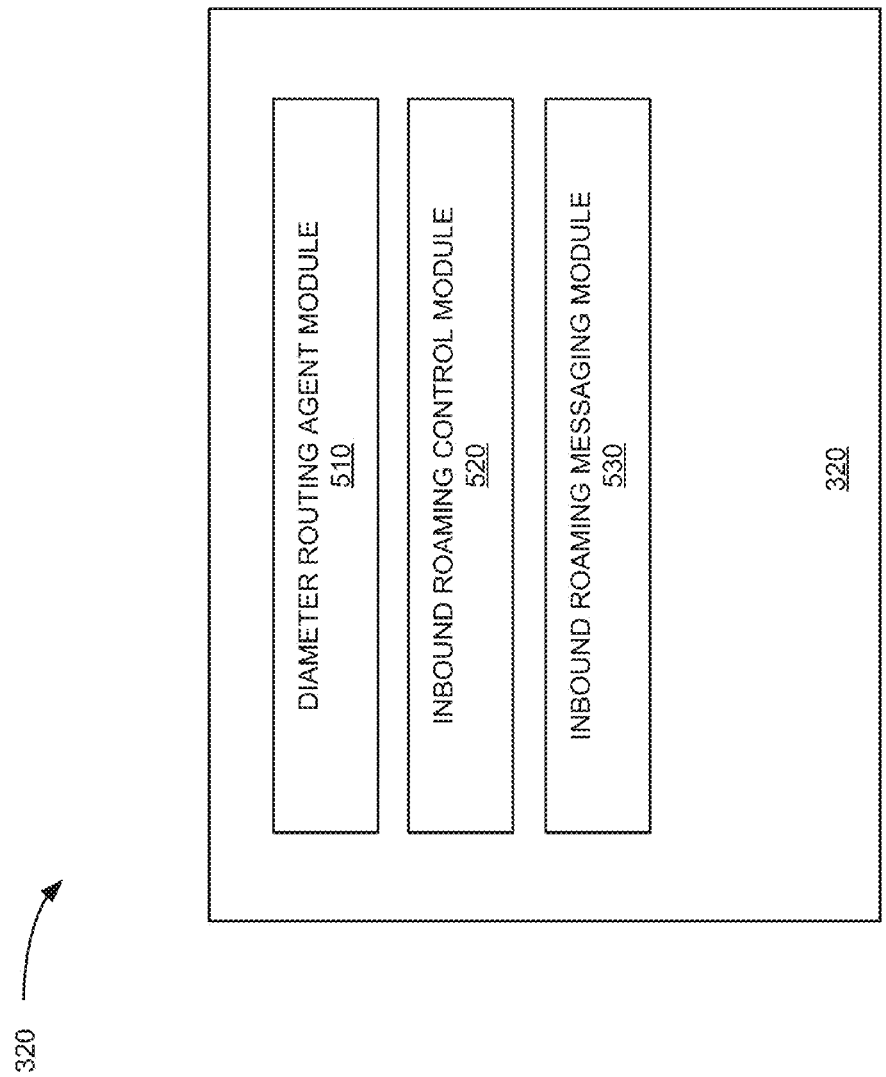
FIG. 5 is a diagram of exemplary functional components of the enhanced diameter routing agent of FIG. 3.

FIG. 5 illustrates an exemplary functional block diagram of enhanced diameter routing agent 320. Device 320 may comprise software, hardware, or a combination of hardware and software. EDRA 320 may include a diameter routing agent module 510, an inbound roaming control module 520 and an inbound roaming messaging module 530. The configuration of components of EDRA 320 illustrated in FIG. 5 is for illustrative purposes only. Other configurations may be implemented. Therefore, EDRA 320 may include additional, fewer and/or different components than those depicted in FIG. 5. FIG. 5 is discussed in conjunction with FIG. 6 and FIG. 7, which illustrate data flow for determination of inbound roaming controls and a blocked lessee PLMN for inbound roaming user equipment, respectively.

Diameter routing agent module 510 may execute functions of a diameter routing agent including ensuing that signaling messages are routed among correct network elements. Diameter routing agent module 510 may identify the IMSI of the roaming UE (which provides an identifier of the home network for the subscriber). Diameter routing agent module 510 may provide routing to the home network based on a determination by the inbound roaming control module 520 that the service provider PLMN has been selected for service by the inbound roaming device, as described in additional detail below. The IMSI identifier contains the MCC and the MNC of the home network and identifies a country and a network to which the user belongs.

Figure 6:
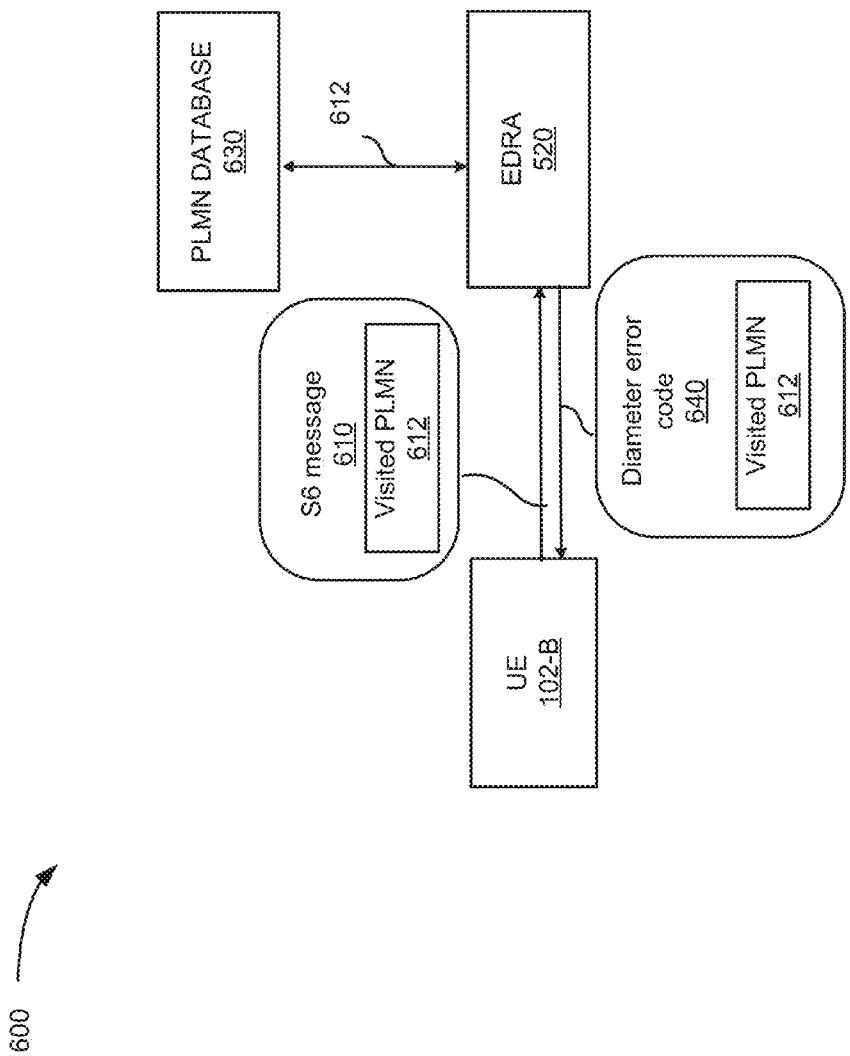
FIG. 6 is a diagram illustrating data flow for determining roaming controls for an inbound roaming controls for a user device based on a selected PLMN according to an implementation described herein.

Inbound roaming control module 520 may determine whether inbound roaming controls are to be applied to a session request received from a UE 102-B. As shown in FIG. 6, in instances that UE 102-B registers at the visited-MME (MME 120) in the visited-PLMN (i.e. the service provider PLMN), MME 120 may send messaging 610, including authentication-information-request and update-location-request message over the S6a interface to HSS 362 in the home network (at which the inbound roaming subscriber's profile is defined). These messages include, among other parameters, the visited-PLMN 612 which is the PLMN selected by UE 102-B for service (i.e., the serving PLMN) and reported to the EPC 106. When MME 120 receives the message 610 from the inbound roaming device (UE 102-B), which selected the lessee PLMN for service, MME 120 may allow that request to go through since it is configured with lessee PLMNs as valid PLMNs for service. These messages 610 may be routed through one or more diameter agents (e.g., EDRA 320, diameter agent 340, diameter agent 370, etc.), either within the visited network or hosted by their IPX provider (e.g., IPX 330), in order to reach the home HSS 362.

Figure 7:
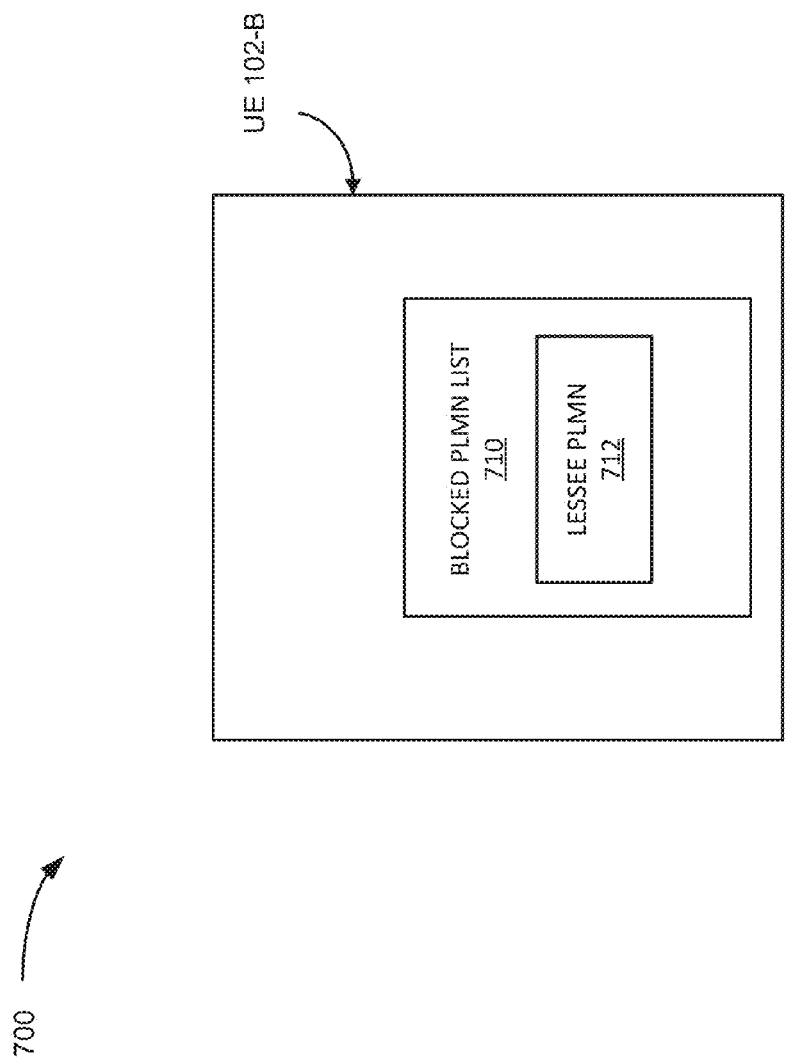
FIG. 7 is a diagram illustrating user device including a blocked lessee PLMN according to an implementation described herein.

In instances in which messaging 610 from an inbound roaming device (e.g., UE 102-B) arrives at the EDRA 320 (which in this instance is the diameter routing agent of the visited network or service provider), inbound roaming control module 520 may check if the selected PLMN, represented by the visited-PLMN field 612 in the S6a message, is the service provider PLMN or the lessee PLMN. Inbound roaming control module 520 may check against a database 630 of PLMNs that identifies the service provider PLMN, which are to be allowed and the lessee PLMNs, which are not to be allowed to provide roaming sessions in the network 310. If the visited-PLMN matches any of the configured lessee PLMNs for which the network is shared, the Inbound roaming control module 520 may block that request and inbound roaming messaging module 530 may respond with an inbound roaming control message (i.e., a diameter error code 640 that includes the forbidden PLMN 612) to the UE 102-B that forces that lessee PLMN 712 to be placed in the forbidden list on the UE's 102-B universal integrated circuit card (UICC) 710 as shown in FIG. 7.

Figure 8:
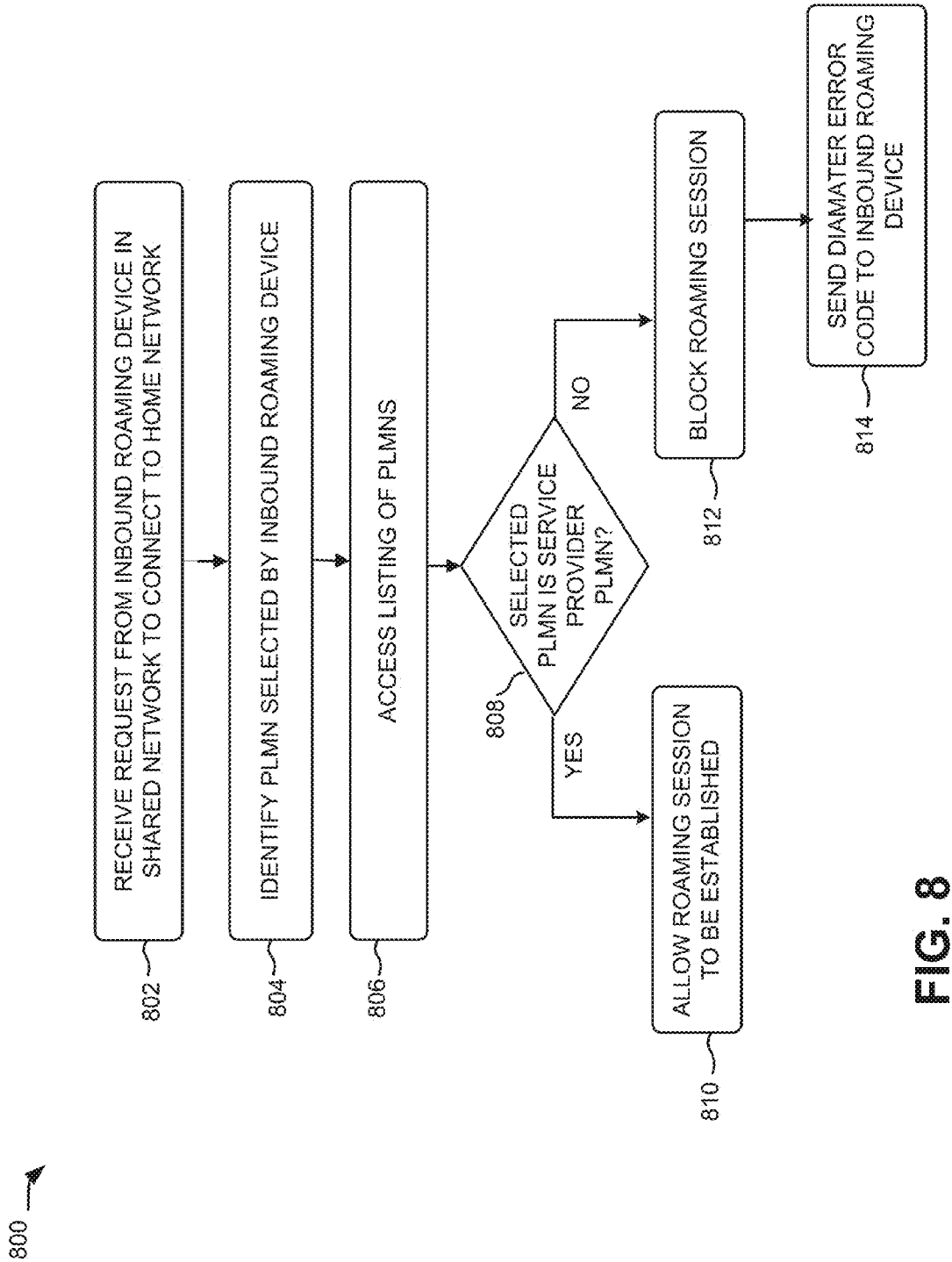
FIG. 8 is a flow chart of an exemplary process to provide roaming controls for an inbound roaming user device in a shared network according to an implementation described herein.

FIG. 8 is a flow chart of an exemplary process to provide roaming controls for an inbound roaming user device in a shared network according to implementations described herein. Process 800 is described with respect to architecture 300 shown in FIG. 3, for illustrative purposes. In one implementation, process 800 may be performed by EDRA 320. In another implementation, some or all of process 800 may be performed by another device or group of devices, including or excluding EDRA 320.

As shown in FIG. 8, EDRA 320 may receive a request from an inbound roaming device (e.g., UE 102-B) in a shared network to connect to a home network of the inbound roaming device to establish a session (block 802). The lessee PLMN may be allowed in the shared network because lessee subscriber's devices may select the lessee PLMN to access through their own network. Therefore, MME 120 may allow the lessee PLMN.

At block 804, EDRA 320 may identify the PLMN selected by the inbound roaming device. For example, EDRA 320 may check the visited PLMN field in the messaging received from the inbound roaming device.

EDRA 320 may access a listing of PLMNs that indicates PLMNs for which roaming is allowed in the shared network (block 806). EDRA 320 may access a list that includes service provider PLMNs, for which roaming is allowed, and lessee PLMNs, for which roaming is not allowed.

EDRA 320 may determine whether the selected PLMN is an allowed PLMN for roaming (i.e., the service provider PLMN) (block 808). EDRA 320 may enact network checks in accordance with agreement between the service provider and the lessee and agreements between the service provider and the home network of the inbound roaming device.

At block 810, EDRA 320 may allow the session to be established in response to a determination (block 808, yes) that the selected PLMN is the service provider PLMN. In this instance the inbound roaming device is allowed to establish a session on the shared network using the service provider's PLMN.

EDRA 320 may block the roaming session in response to a determination that the inbound roaming device is attempting connect through the lessee PLMN (block 812). The combination of the lessee PLMN and the home network of the inbound roaming user device is not allowed. Therefore, if the inbound roaming user device selects the lessee PLMN, which it is not contractually allowed to select, EDRA 320 may block the roaming session to prevent access through a PLMN (the lessee PLMN) with which there isn't a roaming agreement recognized by the service provider.

EDRA 320 may send diameter error code to the inbound roaming user device (block 814). The diameter error code will cause the device to add the lessee PLMN to a forbidden list on the inbound roaming user device. EDRA 320 may also steer the inbound roaming user device UE 102-B towards the other broadcasted PLMN (i.e., the service provider PLMN) that is available for inbound roaming service.

Systems and/or methods described herein may be implemented in a shared network maintained by a first entity (e.g., a service provider) that includes multiple broadcasted public land mobile networks (PLMNs), such as a first PLMN associated with the first entity and a second PLMN associated with a second entity (e.g., a lessee of the service provider). The systems and methods may provide protection for inbound roaming user devices associated with a bilateral partner of the first entity that are allowed to connect to bilateral partner's network via the first PLMN. In instances in which the inbound roaming user equipment selects the second PLMN, the systems and methods may prevent the establishment of a session towards the bilateral partner's network. Hence, lessee PLMNs can't be used for service by inbound roaming devices. The systems and methods may prevent lessee from implementing their own Inbound LTE roaming agreements with other operators using service provider resources.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 8, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A computer-implemented method comprising:
   receiving, at a network device in a shared network that includes a plurality of public land mobile networks (PLMNs) that broadcast within a particular area, a request from an inbound roaming user device in the shared network to connect to a home network of the inbound roaming user device, wherein the home network is external to the shared network;
   identifying, by the network device, a PLMN selected by the inbound roaming user device from among the plurality of PLMNs in the shared network;
   accessing a listing of allowed PLMNs and disallowed PLMNs for roaming in the shared network;
   determining whether the selected PLMN is an allowed PLMN; and
   blocking the connection to the home network in response to a determination that the selected PLMN is not an allowed PLMN.

2. The computer-implemented method of claim 1, wherein the network device is a diameter routing agent.

3. The computer-implemented method of claim 1, further comprising:
   allowing the connection to the home network in response to a determination that the selected PLMN is an allowed PLMN.

4. The computer-implemented method of claim 1, wherein blocking the connection to the home network further comprises:
   sending a diameter error code to the inbound roaming user device that directs the inbound roaming user device to add the selected PLMN to a forbidden list of PLMNs for roaming.

5. The computer-implemented method of claim 1, wherein the shared network includes a service provider PLMN associated with a service provider for the shared network and a lessee PLMN associated with a lessee of the service provider and the lessee PLMN is not allowed for roaming.

6. The computer-implemented method of claim 5, wherein the shared network includes enhanced node base stations that broadcast to both the service provider PLMN and the lessee PLMN.

7. The computer-implemented method of claim 5, wherein the network device implements network checks based on an existing agreement between the lessee and the service provider.

8. The computer-implemented method of claim 1, wherein determining whether the selected PLMN is an allowed PLMN further comprises:
    identifying whether an international mobile subscriber identity (IMSI) indicates a particular home network; and
    identifying whether the selected PLMN is included in a disallowed combination of home network and PLMN.

9. The computer-implemented method of claim 1, wherein the shared network includes a shared radio access network, gateway nodes and evolved packet core components.

10. The computer-implemented method of claim 1, wherein identifying the PLMN selected by the inbound roaming user device, further comprises:
    identifying a visited PLMN field in messaging provided by the inbound roaming user device.

11. A network device in a shared network that includes a plurality of public land mobile networks (PLMNs) that broadcast within a particular area, comprising:
    a memory to store a plurality of instructions; and
    a processor configured to execute instructions in the memory to:
        receive, from an inbound roaming user device in the shared network, a request to connect to a home network of the inbound roaming user device, wherein the home network is external to the shared network;
        identify a PLMN selected by the inbound roaming user device from among the plurality of PLMNs in the shared network;
        access a listing of allowed PLMNs and disallowed PLMNs for roaming in the shared network;
        determine whether the selected PLMN is an allowed PLMN; and
        block the connection to the home network in response to a determination that the selected PLMN is not an allowed PLMN.

12. The device of claim 11, wherein the network device is a diameter routing agent.

13. The device of claim 11, wherein the processor is further configured to:
    allow the connection to the home network in response to a determination that the selected PLMN is an allowed PLMN.

14. The device of claim 11, wherein, when blocking the connection to the home network, the processor is further configured to
    send a diameter error code to the inbound roaming user device that directs the inbound roaming user device to add the selected PLMN to a forbidden list of PLMNs for roaming.

15. The device of claim 11, wherein the shared network includes a service provider PLMN associated with a service provider for the shared network and a lessee PLMN associated with a lessee of the service provider and the lessee PLMN is not allowed for roaming.

16. The device of claim 15, wherein the shared network includes enhanced node base stations that broadcast to both the service provider PLMN and the lessee PLMN.

17. A non-transitory computer-readable medium including instructions to be executed by a processor in a leased network that includes a service provider, and a lessee service provider wherein the lessee service provider leases a radio access network (RAN), and an evolved packet core (EPC) from the service provider and supplies lessee subscribers from a same set of international mobile subscriber identities (IMSIs) as provided to subscribers of the service provider, the instructions including one or more instructions, when executed by the processor, for causing the processor to:
    receive, from an inbound roaming user device in the leased network, a request to connect to a home network of the inbound roaming user device, wherein the home network is external to the leased network;
    identify a public land mobile network (PLMN) in the leased network selected by the inbound roaming user device from among a plurality of PLMNs that broadcast within a particular area in the leased network;
    access a listing of allowed PLMNs and disallowed PLMNs for roaming in the leased network;
    determine whether the selected PLMN is an allowed PLMN; and
    block the connection to the home network in response to a determination that the selected PLMN is not an allowed PLMN.

18. The non-transitory computer-readable medium of claim 17, wherein the instructions further include instructions for causing the processor to:
    allow the connection to the home network in response to a determination that the selected PLMN is an allowed PLMN.

19. The non-transitory computer-readable medium of claim 17, wherein, when blocking the connection to the home network, the instructions further include instructions for causing the processor to:
    send a diameter error code to the inbound roaming user device that directs the inbound roaming user device to add the selected PLMN to a forbidden list of PLMNs for roaming.

20. The computer-readable medium of claim 19, wherein, wherein the diameter error code further includes instructions to connect to an allowed PLMN.

* * * * *